(12) United States Patent
Hebiguchi

(10) Patent No.: US 8,213,859 B2
(45) Date of Patent: Jul. 3, 2012

(54) DATA COMMUNICATION SYSTEM

(75) Inventor: Hiroyuki Hebiguchi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 356 days.

(21) Appl. No.: 12/562,092

(22) Filed: Sep. 17, 2009

(65) Prior Publication Data
US 2010/0009628 A1  Jan. 14, 2010

Related U.S. Application Data

(63) Continuation of application No. PCT/JP2008/055454, filed on Mar. 24, 2008.

(30) Foreign Application Priority Data

Mar. 30, 2007  (JP) ................................. 2007-091852
May 24, 2007  (JP) ................................. 2007-137580

(51) Int. Cl.
*H04B 5/00* (2006.01)
(52) U.S. Cl. ...................................... 455/41.1
(58) Field of Classification Search ................. 455/41.1
See application file for complete search history.

(56) References Cited

U.S. PATENT DOCUMENTS

| | | | | |
|---|---|---|---|---|
| 2006/0178109 A1* | 8/2006 | Takiguchi | ..................... | 455/41.1 |
| 2007/0026804 A1* | 2/2007 | Ishibashi et al. | ............. | 455/63.1 |
| 2007/0184788 A1* | 8/2007 | Minotani et al. | ............. | 455/117 |

FOREIGN PATENT DOCUMENTS

| | | |
|---|---|---|
| JP | 11-509380 | 8/1999 |
| JP | 2004-128744 | 4/2004 |
| JP | 2004-266388 | 9/2004 |
| JP | 2005-026784 | 1/2005 |
| JP | 2005-277719 | 6/2005 |
| WO | 96/36134 | 11/1996 |

OTHER PUBLICATIONS

Search Report dated May 20, 2008 from International Application No. PCT/JP2008/055454.

* cited by examiner

*Primary Examiner* — Temesgh Ghebretinsae
*Assistant Examiner* — David Bilodeau
(74) *Attorney, Agent, or Firm* — Beyer Law Group LLP

(57) ABSTRACT

A data communication system includes a transmission medium such as a human body for transmitting an information signal via an electric field, a mobile device including a sender for imparting the electric field in which the information signal is modulated to the transmission medium, a stationary device including a receiver for detecting the electric field via the transmission medium and demodulating the electric field into the information signal, a floor cover arranging the stationary device and also being contacted by the transmission medium, in which the floor cover has a communication area contacted by the transmission medium where a data communication is performed between the mobile device and the stationary device, and the communication area is in a state of being electrically floating with respect to the floor cover.

15 Claims, 7 Drawing Sheets

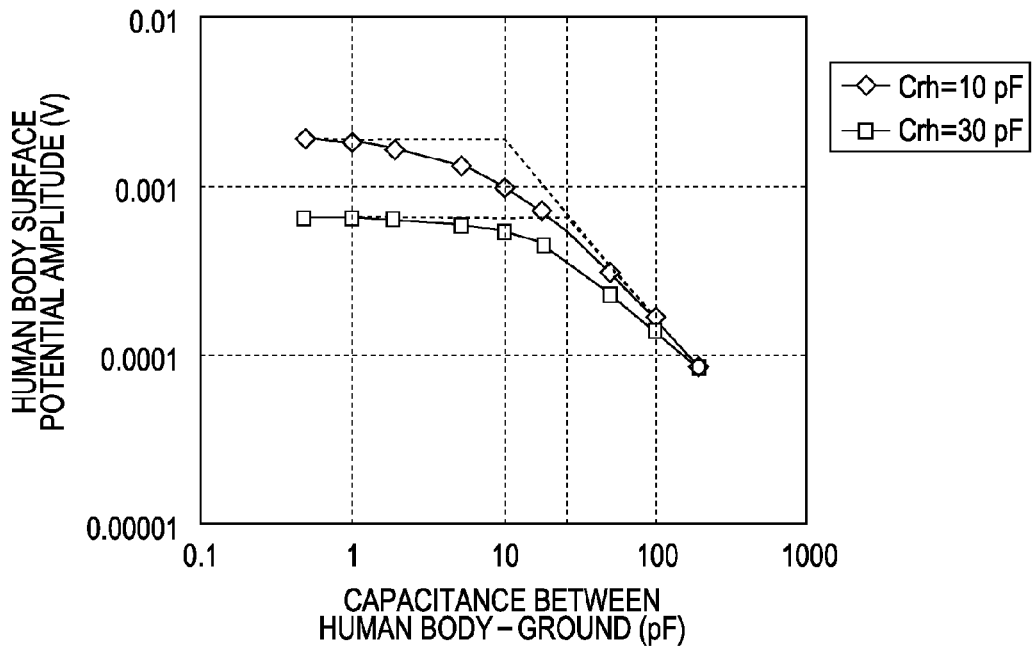
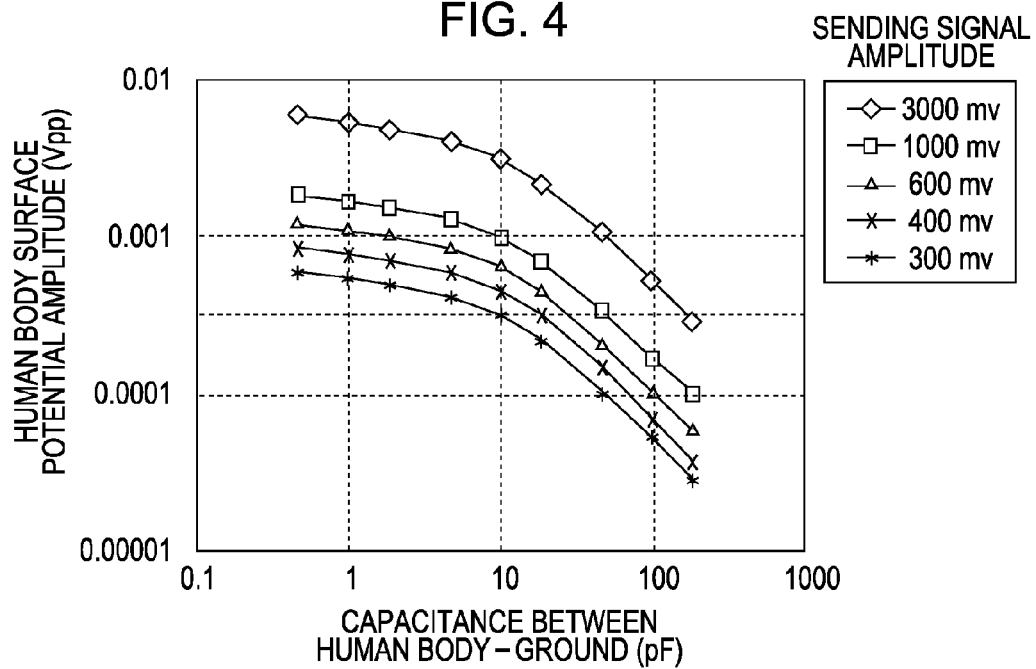

DATA COMMUNICATION SYSTEM

CLAIM OF PRIORITY

This application is a Continuation of International Application No. PCT/JP2008/055454 filed on Mar. 24, 2008, which claims benefit of Japanese Patent Application No. 2007-091852 filed on Mar. 30, 2007 and Japanese Patent Application No. 2007-137580 filed on May 24, 2007, which are all hereby incorporated by reference.

BACKGROUND OF THE INVENTION

1. Field of the Invention

The present invention relates to a data communication system in which sending and reception are performed via a transmission medium such as a human body.

2. Description of the Related Art

Along with a technological development of recent years, a communication method of using an electric field induced by a human body or the like has been proposed as a completely new communication method. Such a communication method includes one disclosed in PCT Japanese Translation Patent Publication No. 11-509380. In this communication system, an electric field corresponding to a modulation signal obtained by modulating an information signal is imparted from a sender to a human body serving as a transmission medium. The electric field transmitted to the human body is detected by a receiver, and a signal corresponding to the electric field is demodulated.

SUMMARY OF THE INVENTION

However, in the data communication system disclosed in PCT Japanese Translation Patent Publication No. 11-509380, a greater part of the electric field sent to the human body from the sender flows into a ground from the human body, and a problem exists that a reception sensitivity at the receiver is appalling. In order to realize a communication, it is necessary to use a receiver with a sufficiently high sensitivity or increase a sending poser of the sender, which is not suitable for practical application.

The present invention has been made in view of the above-mentioned points and provides a data communication system capable of performing a communication while using a practical receiver and also at a relatively small sending power.

According to an aspect of the present invention, there is provided a data communication system including: a sender including modulation means configured to modulate an information signal into an electric field; a receiver including demodulation means configured to demodulate the electric field into the information signal; a transmission medium configured to transmit the information signal via the electric field and take along the sender or the receiver; and a floor cover arranging the sender or the receiver as a stationary device and also being contacted by the transmission medium, in which the floor cover has a communication area contacted by the transmission medium at the time of performing a data communication between the sender and the receiver, the communication area is in a state of being electrically floating with respect to a ground of the floor cover, and an electrostatic capacitance between the communication area contacted by the transmission medium and the ground is equal to or smaller than an electrostatic capacitance between the receiver and the transmission medium.

According to this configuration, as the communication area contacted by the transmission medium where the data communication is performed between the sender and the receiver is in the state of being electrically floating with respect to the ground of the floor cover, the great part of the electric field sent from the sender to the transmission medium is suppressed from flowing from the transmission medium to the ground of the floor cover. For this reason, the transmission efficiency in which the electric field corresponding to the information signal reaches the receiver can be increased. As a result, it is possible to perform the communication while using the practical receiver and also at a relatively small sending power.

In the data communication system according to the aspect of the present invention, in the communication area, the electrostatic capacitance with respect to the ground of the floor cover contacted by the transmission medium is preferably equal to or smaller than the electrostatic capacitance between the receiver and the transmission medium. According to this configuration, the sending power of the sender can be suppressed, and it is possible to extend a battery life of the mobile device.

In the data communication system according to the aspect of the present invention, the electrostatic capacitance between the communication area contacted by the transmission medium and the ground is preferably equal to or smaller than 10 pF. According to this configuration, the sending power of the sender can be suppressed, and it is possible to extend the battery life of the mobile device.

In the data communication system according to the aspect of the present invention, the communication area preferably includes a drainage area running through the floor cover and a net-like member covering the drainage area. According to this configuration, even in a case where the fluids are brought into the floor cover, the fluids are promptly drained, and it is possible to suppress the electric field sent from the sender to the transmission medium from flowing from the transmission medium to the ground of the floor cover.

The data communication system according to the aspect of the present invention preferably further includes static elimination means configured to neutralize an electric charge of the transmission medium when or before the transmission medium enters the communication area. According to this configuration, it is possible to prevent the electric discharge when the electrostatically charged transmission medium approaches the stationary device.

The data communication system according to the aspect of the present invention preferably further includes drying means configured to dry the floor cover. According to this configuration, even when the dew condensation exists on the floor cover or the transmission medium, this is dried, and the stable communication can be maintained.

In the data communication system according to the aspect of the present invention, the floor cover preferably further includes monitor means configured to monitor whether the communication area is in the state of being electrically floating with respect to the ground of the floor cover. According to this configuration, the user can be promptly notified of the abnormity of the system.

In the data communication system according to the aspect of the present invention, the floor cover is connected to a ground via an impedance member having a relatively high impedance in a carrier frequency at the time of performing a data communication between the sender and the receiver and having a relatively low impedance in a frequency lower than the carrier frequency.

According to this configuration, as the impedance element has the relatively high impedance in the carrier frequency at the time of performing the data communication, the potential of the transmission medium surface becomes large, and the great part of the electric field sent from the sender to the transmission medium is suppressed from flowing from the transmission medium to the ground of the floor cover. For this reason, the transmission efficiency in which the electric field corresponding to the information signal reaches the receiver can be increased. Also, furthermore, the impedance element has the relatively low impedance in the frequency lower than the carrier frequency, and the electric charge based on the static electricity can be let out to the ground. Therefore, according to this configuration, while suppressing the sending power, the reliable communication can be performed with the inexpensive receiver, and also the countermeasure against the static electricity can be implemented.

In the data communication system according to the aspect of the present invention, the impedance member is preferably composed of a capacitance element arranged between the floor cover and the ground and a resistance or an inductor connected in parallel with the capacitance element.

In the data communication system according to the aspect of the present invention, it is preferable that the floor cover includes a communication area contacted by the transmission medium at the time of performing the data communication between the sender and the receiver and a ground electrode arranged substantially parallel with the communication area, and the capacitance element is an electrostatic capacitance formed between the communication area and the ground electrode.

In the data communication system according to the aspect of the present invention, a porous dielectric is preferably arranged between the communication area and the ground electrode. According to this configuration, as the average dielectric constant of the porous member becomes small, at the time of setting the electrostatic capacitance between the floor cover and the ground as a predetermined value, in the case of the same area, the thickness of the porous member can be reduced.

In the data communication system according to the aspect of the present invention, the impedance of the impedance member becomes largest in the carrier frequency.

The data communication system according to the aspect of the present invention includes the sender including modulation means configured to modulate the information signal into the electric field; the receiver including demodulation means configured to demodulate the electric field into the information signal; the transmission medium configured to transmit the information signal via the electric field and take along the sender or the receiver; and the floor cover arranging the sender or the receiver as the stationary device and also being contacted by the transmission medium, in which the floor cover has the communication area contacted by the transmission medium at the time of performing the data communication between the sender and the receiver, and the communication area is in the state of being electrically floating with respect to the ground of the floor cover. The electric field sent from the sender to the human body is thus suppressed from flowing from the human body to the ground, and the communication can be performed at the relatively small sending power. For this reason, while suppressing the power consumption of the device to which the sending module such as the IC card is mount, it is possible to extend the battery life.

Also, as the floor cover is connected to the ground via the impedance member having the relatively high impedance in the carrier frequency at the time of performing the data communication between the sender and the receiver and having the relatively low impedance in the frequency lower than the carrier frequency, the electric field sent from the sender to the human body is suppressed from flowing from the human body to the ground, and the practical receiver is used. Also, the communication can be performed at the relatively small sending power, and furthermore the countermeasure against the static electricity can be implemented.

BRIEF DESCRIPTION OF THE DRAWINGS

FIG. 3 shows a relation between a human body surface potential amplitude and a capacitance between a human body—a ground;

FIG. 4 shows a relation between a human body surface potential amplitude and a capacitance between a human body—a ground;

FIGS. 5A and 5B are schematic configuration drawings showing a data communication system according to Embodiment 2 of the present invention, in which FIG. 5A shows a perspective view, and FIG. 5B shows a side view;

DESCRIPTION OF THE PREFERRED EMBODIMENTS

Hereinafter, embodiments of the present invention will be described in detail with reference to the accompanying drawings.

Embodiment 1

Figure 1:
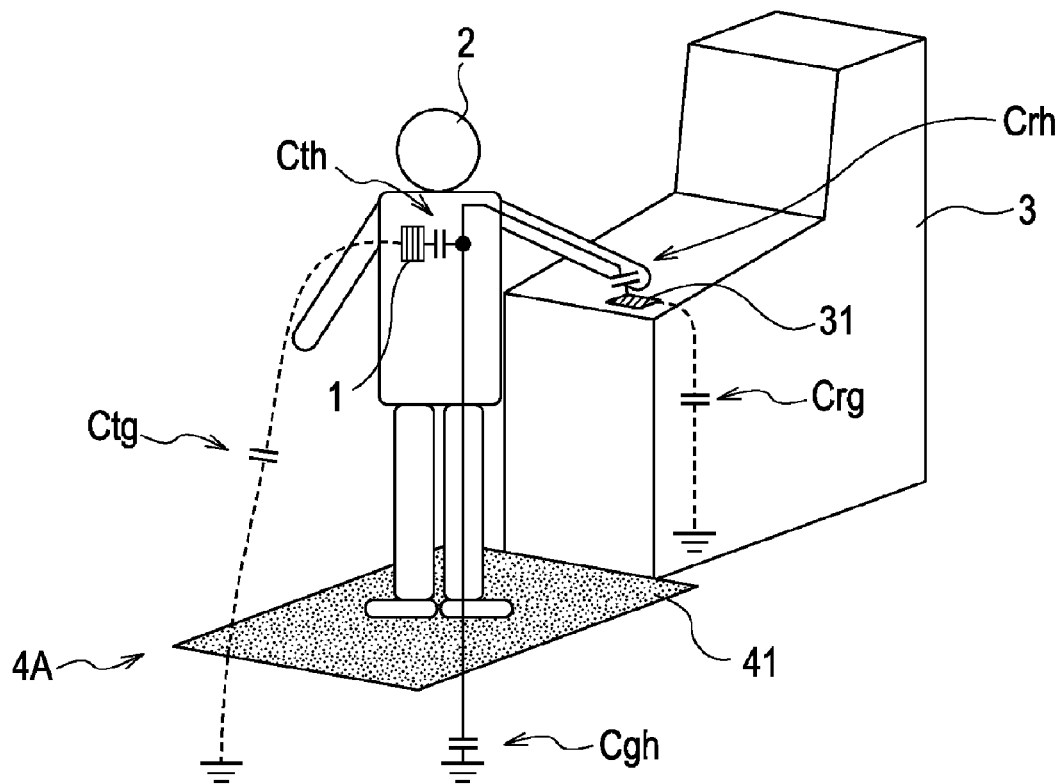
FIG. 1 shows a data communication system according to Embodiment 1 of the present invention.
Figure 2:
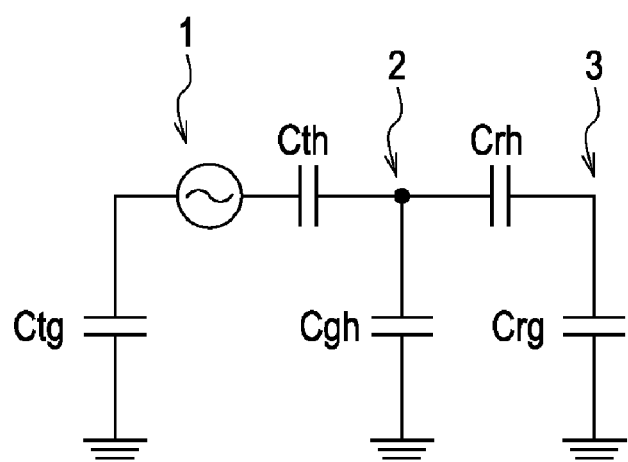
FIG. 2 shows an equivalent circuit of the data communication system shown in FIG. 1.

In the present embodiment, a case will be described in which a data communication system according to the present invention is applied to an electronic money system. FIG. 1 is a schematic configuration diagram of a data communication system according to Embodiment 1 of the present invention. Also, FIG. 2 shows an equivalent circuit of the data communication system shown in FIG. 1.

FIG. 1 shows a case in which, in a state where a user takes along a mobile device 1 in a chest pocket or the like, the hand is exposed to a stationary device 3 such as a data reader, and data is read from the hand. That is, the data communication system shown in FIG. 1 is mainly composed of the human body 2 serving as a transmission medium for transmitting an information signal via an electric field, the mobile device 1 to which a sender for imparting the electric field obtained by modulating the information signal is mounted, the stationary device 3 provided with a receiver for detecting the electric field via the human body 2 and demodulating the electric field into the information signal, and a floor cover 4A arranged in the vicinity of the stationary device 3 and also contacted by the human body 2.

In the data communication system according to the present invention, as the mobile device 1, an IC card provided with a communication module, a mobile phone, and the like can be exemplified. Also, as the stationary device 3, an ATM, a reader/writer such as electronic money and various IC cards, and the like can be exemplified. Also, the stationary device 3 is provided with an electrode 31 for a communication for performing a data communication as the human body 2 approaches. It should be noted that as it suffices that an electrostatic coupling between the human body 2 and the stationary device 3 is established, a surface of the electrode 31 for the communication may be coated with an insulating material.

The floor cover 4A has a communication area 41 contacted by the human body 2 when a data communication is performed between the mobile device 1 and the stationary device 3, and a state is established where the communication area 41 is electrically floating with respect to a ground of the floor cover 4A. Regarding the communication area 41 of the floor cover 4A, in order to establish a state of being electrically floating with respect to the ground of the floor cover 4A, it is desirable that the floor cover 4A is composed of concrete, reinforced plastic, or the like, and a tabular insulating member is arranged thereon as the communication area 41. Also, in a case where a conductive member is used for the communication area 41, so that the communication area 41 is not electrically connected to the ground of the floor cover 4A, it is desirable that an insulating material or the like is arranged between the communication area 41 and the floor cover 4A. It should be noted that if a carpet or the like may be laid on the communication area 41 if no continuity is caused with the ground of the floor cover 4A.

In this manner, as a state is established where the communication area 41 is electrically floating with respect to the ground of the floor cover 4A, that is, the communication area 41 is set in an insulating state from the ground of the floor cover 4A, a signal sent from the mobile device 1 to the human body 2 is suppressed from flowing from the human body 2 via the floor cover 4A into the ground, and a transmission efficiency in which the signal reaches the stationary device 3 can be improved. As a result, it is possible to increase a transmission efficiency in which the electric field corresponding to the information signal reaches the stationary device 3. As a result, it is possible to perform the communication while using the practical receiver and also at a relatively small sending power.

In this communication system, as shown in FIG. 2, a capacity coupling is electrically caused via a capacitor between the mobile device 1 provided with the sender and the human body 2 serving as the transmission medium, and between the stationary device 3 provided with the receiver and the human body 2, and the information signal is transmitted by way of the electric field in which the information signal is modulated. In this case, a displacement current flows but a stationary current does not flow into the human body 2, and therefore the electric continuity is not necessarily caused. Therefore, for example, while the mobile device 1 is kept in the pocket, as the capacity coupling between the mobile device 1 and the human body 2 is caused via a thin cloth, the transmission of the information signal can be performed.

In the data communication having the above-mentioned configuration, an operation in a case where a data communication is performed will be described. First, in the mobile device 1, a carrier wave having a frequency (several tens of kHz to several MHz in which the human body 2 shows a conductive property) is modulated by the information signal to obtain a modulation signal. This modulation signal is amplified and converted into a voltage change, which becomes an electric field corresponding to the modulation signal. Then, this electric field is imparted to the human body 2. It should be noted that no particular limitation exists on a modulation method in the mobile device 1.

The electric field imparted to the human body 2 is received by the electrode 31 for the communication of the stationary device 3. When the electric field is added to the electrode 31 for the communication, a physical quantity (induced electromotive force, induced current) is induced, and the physical quantity is detected by a signal detection circuit (not shown).

The physical quantity detected by the signal detection circuit is sent to a demodulation circuit (not shown), and in the demodulation circuit, the carrier wave by the mobile device 1 is used to perform a modulation to obtain the information signal. In this way, it is possible to perform the data sending and reception by using the human body as the transmission medium.

In an equivalent circuit shown in FIG. 2, an electrostatic capacitance between the mobile device 1 functioning as the sender and the human body 2 is set as Cth, an electrostatic capacitance between the stationary device 3 functioning as the receiver and the human body 2 is set as Crh, an electrostatic capacitance between the ground of the floor cover 4A and the human body 2 is set as Cgh, an electrostatic capacitance between the mobile device 1 and the ground of the floor cover 4A is set as Ctg, and an electrostatic capacitance between the stationary device 3 and the ground is set as Crg. Also, the mobile device 1 is a signal source and represented as an alternate current source, and the human body 2 is treated as an electric conductor. The stationary device 3 is electrically connected to the ground of the floor cover 4A. It should be noted that even in a case where the stationary device 3 is set as the sender, and the mobile device 1 is set as the receiver, one skilled in the art can easily understand that the equivalent circuit becomes similar.

In such a configuration, in order to efficiently transmit the signal from the mobile device 1, the electrostatic capacitance Crg between the stationary device 3 and the ground and the electrostatic capacitance Ctg between the mobile device 1 and the ground are preferably larger, and for the electrostatic capacitance between the human body and the ground, Cgh is preferably smaller. That is, at the time of the data communication via the human body 2, the electrostatic capacitance Cgh between the human body and the ground is set small, and in other cases, the electrostatic capacitances Crg and Cgh between the human body and the ground are set large, so that the signal leakage can be set small.

Herein, it is supposed for actual values in the equivalent circuit shown in FIG. 2 that the electrostatic capacitance Cth between the mobile device 1 and the human body 2 is about 10 pF, the electrostatic capacitance Crh between the stationary device 3 and the human body 2 is about 10 pF to 30 pF, the electrostatic capacitance Ctg between the mobile device 1 and the ground is about 10 fF, and the electrostatic capacitance Crg between the stationary device 3 and the ground is about 1 nF. Also, a relation between the surface potential amplitude V (Vpp) induced on the surface of the human body 2 and the electrostatic capacitance Cgh between the human body—the ground is simulated in a case where the signal from the mobile device 1, that is, the signal source has a frequency of 10 MHz and an amplitude of ±1 V. A result thereof is shown in FIG. 3.

As being understood from FIG. 3, when the electrostatic capacitance Crh between the stationary device 3 and the human body 2 is either 10 pF or 30 pF, as the electrostatic capacitance Cgh between the human body—the ground is smaller, the surface potential amplitude of the human body is larger, and the signal is easier to read. Also, as being understood from FIG. 3, with regard to the electrostatic capacitance Crh between the stationary device 3 for reading the data and the human body 2 of 30 pF, Cgh is in the vicinity of 30 pF, and with regard to the electrostatic capacitance Crh of 10 pF, the electrostatic capacitance Cgh is in the vicinity of 10 pF, so that an inclination of a characteristic curve (inclination of a tangent of the characteristic curve) is changed. From this point, in order to reduce the electrostatic capacitance Cgh, the value is preferably set equal to or smaller than the electrostatic capacitance Crh. That is, the electrostatic capacitance with respect to the ground of the communication area 41 of the floor cover 4A contacted by the human body 2 is set equal to or smaller than the electrostatic capacitance between the stationary device 3 and the human body 2. With this configuration, the sending power of the sender in the mobile device 1 can be suppressed, and it is possible to extend a battery life of the mobile device 1.

Also, in the above-mentioned condition, a relation between the surface potential amplitude of the human body and the electrostatic capacitance Cgh between the human body—the ground is simulated similarly as in FIG. 2 while the electrostatic capacitance Crh between the stationary device 3 and the human body 2 is fixed at 10 pF, and the amplitude of the signal source is fluctuated from ±3 V to ±0.3 V. A result thereof is shown in FIG. 4. It should be noted that in FIG. 4, a position where the surface potential amplitude is 0.3 mV which is easy even for an inexpensive receiver is represented by a dotted line.

The electrostatic capacitance Cgh between the human body and the ground in a case where the communication area 41 of the floor cover 4A is electrically connected to the ground is estimated about 100 pF to 130 pF when it is supposed that a shoe sole is rubber or the like. As being understood from FIG. 4, instead of the configuration according to the present invention, in a case where the communication area 41 of the floor cover 4A is electrically connected to the ground, the surface potential amplitude does not reach 0.3 mV at ±1 V, and therefore the amplitude of the signal source needs to be increased close to 3 V. On the other hand, with the configuration according to the present invention, if the electrostatic capacitance Cgh is set equal to or smaller than 10 pF, the surface potential amplitude reaches 0.3 mV even when the amplitude of the signal source is at ±0.3 V. Therefore, as the electrostatic capacitance Cgh is set equal to or smaller than 10 pF, that is, as the electrostatic capacitance with respect to the ground of the communication area 41 of the floor cover 4A contacted by the human body 2 is set equal to or smaller than 10 pF, a practical system can be configured by using an inexpensive receiver, and it is also possible to suppress a power consumption on the mobile device side to low.

It should be noted that in the present embodiment, a case has been described in which the mobile device 1 is set as the sender, and the stationary device 3 is set as the receiver, but according to the present invention, the mobile device may be set as a receiver, and the stationary device may be set as a sender. In this case too, the above-mentioned equivalent circuit and the effects are similar.

Embodiment 2

In the present embodiment, a case will be described in which the data communication system according to the present invention is applied to an automatic entranceway or an entrance and exit gate.

Figure 5A:
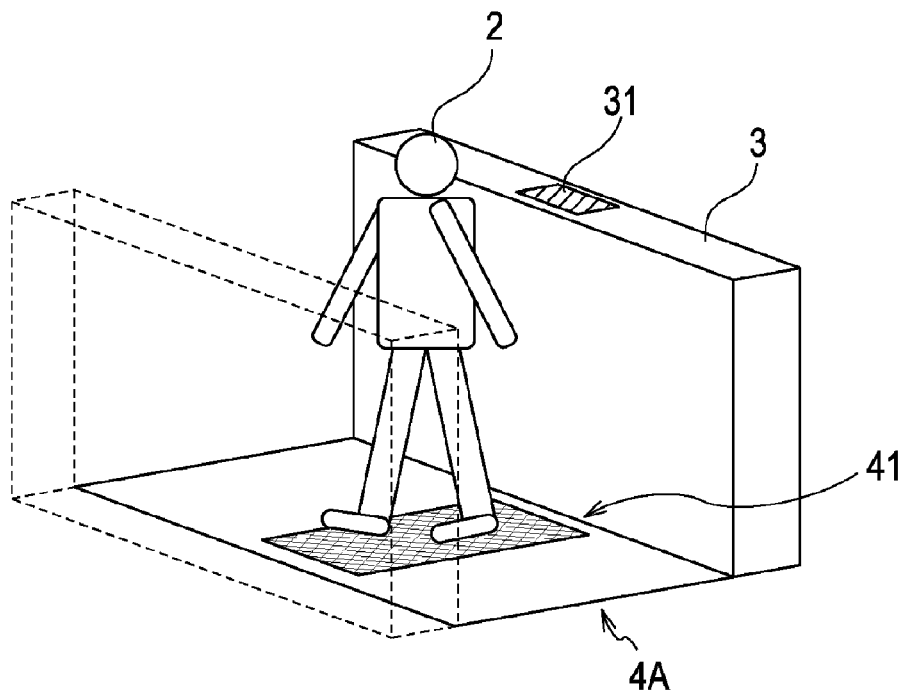
Figure 5B:
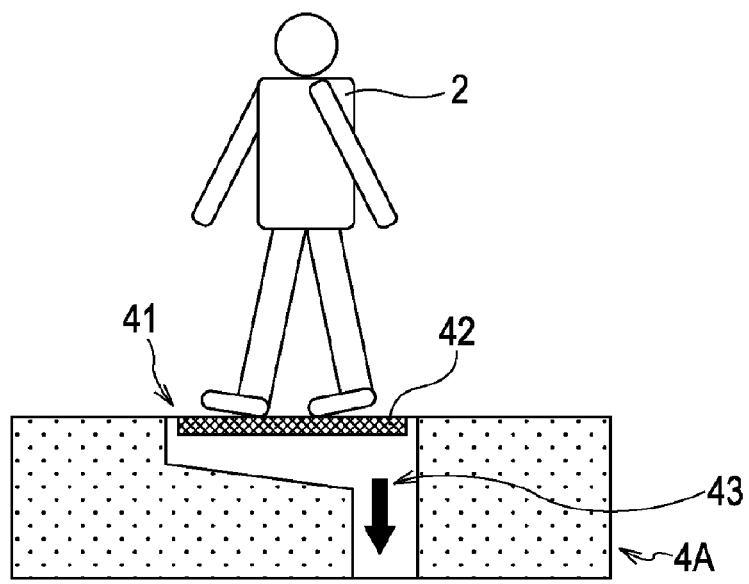

FIGS. 5A and 5B are schematic configuration drawings showing a data communication system according to Embodiment 2 of the present invention, in which FIG. 5A shows a perspective view, and FIG. 5B shows a side view. For example, in a case where the data communication system according to the present invention is applied to a gate such as the automatic entranceway, as shown in FIG. 5A, the stationary device 3 (receiver) having the electrode 31 for the communication is the gate, and the floor cover 4A where the gate is arranged is provided with the communication area 41. Then, the human body 2 carrying the mobile device 1 (sender) passes through this gate.

Although a roof is provided, this gate is in an environment almost similar to the open air, and also an influence of a weather such as rain or snow needs to be taken into account. In this case, as shown in FIG. 5B, the communication area 41 is preferably composed of a drainage area 43 provided so as to run through the floor cover 4A and a net-like member 42 covering the drainage area 43. In this case, the net-like member 42 may be composed of an insulating material or composed of a general metallic material to be attached to the floor cover 4A by an insulating clasp or the like. In this manner, by using the drainage area 43 and the net-like member 42, puddle of fluids on the surface of the communication area 41 is prevented while providing a space below the communication area 41. With this configuration, it is possible to prevent the communication area 41 of the floor cover 4A from being in electrical continuity with the ground by way of the fluids. For this reason, even in a case where the fluids are brought into the floor cover 4A, the fluids are promptly drained, and it is possible to suppress the electric field sent from the mobile device 1 to the human body 2 from flowing from the human body 2 to the ground of the floor cover 4A.

It should be noted that in the structure according to the present embodiment, in order to prevent the fluids from being in electric continuity with the ground, a wall surface in the drainage area 43 may be an insulating body. Also, according to the present embodiment too, the mobile device 1 may be set as a receiver, and the stationary device 3 may be set as a sender.

Embodiment 3

In the present embodiment, a case will be described in which the data communication system according to the present invention is applied to the automatic entranceway and the entrance and exit gate, and a countermeasure against the static electricity is applied.

Figure 6A:
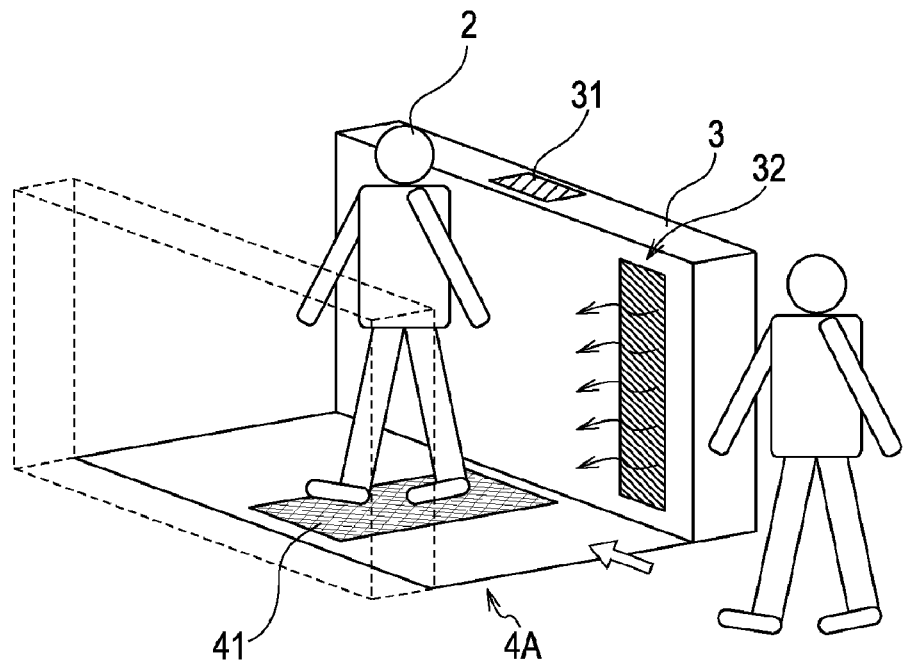
FIGS. 6A and 6B are schematic configuration drawings showing a data communication system according to Embodiment 3 of the present invention.
Figure 6B:
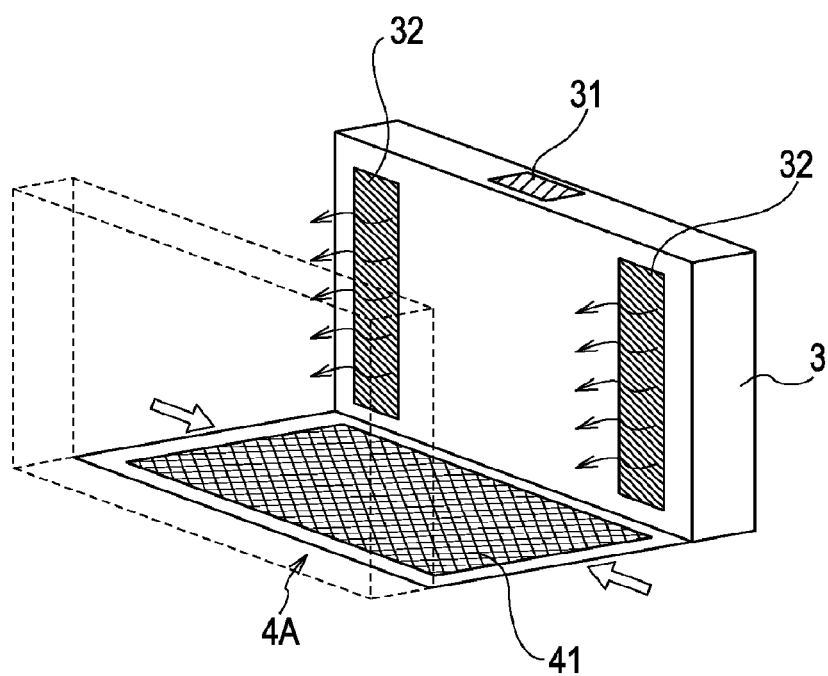

FIGS. 6A and 6B are schematic configuration diagrams showing a data communication system according to Embodiment 3 of the present invention. In a period when air is dry like winter, the human body 2 is easily electrostatically charged. In particular, in the data communication system according to the present invention, a state is established in which the human body 2 is floating from the ground, a potential difference between the electrostatically charged human body 2 and the ground is larger than usual. When a hand or the like is put close to the electrode 31 for the communication of the stationary device 3, a possibility is high that electric discharge is caused.

In view of the above, in the present embodiment, as shown in FIG. 6A, a static elimination blower 32 for neutralizing static electrification of the human body 2 is provided to the stationary device 3. With this configuration, when or before the human body 2 enters the communication area 41 at the gate of the automatic entranceway, the static elimination of the human body 2 is performed. Therefore, a position at which the static elimination blower 32 is arranged is provided before the electrode 31 for the communication toward a travelling direction (arrow direction) of the human body 2. Also, as shown in FIG. 6B, in a gate where passage can be bi-directionally performed, in either travelling directions, in order that the static elimination of the human body 2 can be performed before the data communication is performed, the static elimination blowers 32 are provided on both sides of the gate. With such a configuration, it is possible to prevent the electric discharge when the electrostatically charged human body 2 approaches the stationary device 3.

It should be noted that in order to increase the static elimination effects, the floor cover 4A in the static elimination area is also desirably floating from the ground similarly as in the electrode area for the communication. Also, in order not to generate noise of the frequency used for the communication via the human body 2, desirably, the static elimination blower 32 is driven at a frequency different from the frequency used for the communication, and the static elimination blower 32 itself is shielded.

Embodiment 4

In the present embodiment, a case will be described in which the data communication system according to the present invention is applied to the automatic entranceway and the entrance and exit gate, and a countermeasure against dew condensation prevention is applied.

Figure 7:
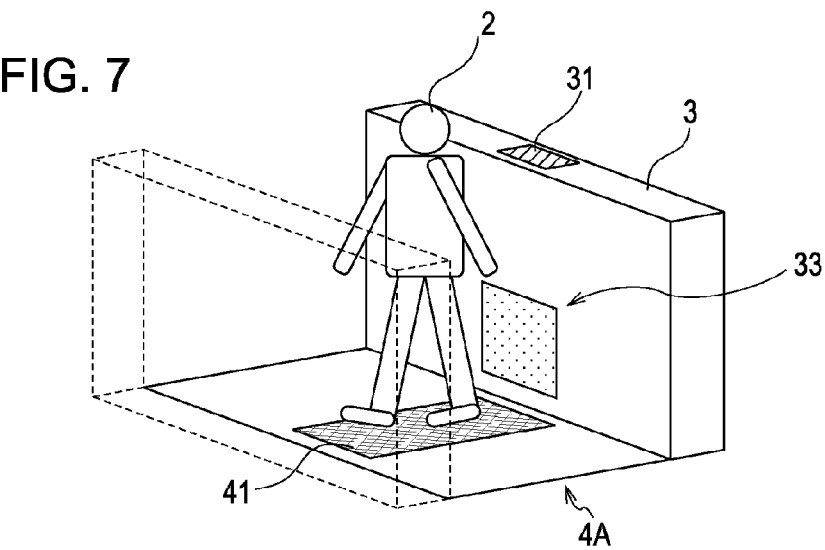
FIG. 7 is a schematic configuration drawing showing a data communication system according to Embodiment 4 of the present invention.

FIG. 7 is a schematic configuration diagram showing a data communication system according to Embodiment 4 of the present invention. In the configuration shown in FIG. 7, a lamp heater 33 functioning as drying means configured to dry the floor cover 4A is provided. With this configuration, even when dew condensation exists on the floor cover 4A or the human body 2, by drying this, it is possible to maintain the stable communication state.

In the configuration shown in FIG. 7, preferably, a state in which dew condensation is predicted is detected, and in that case, the lamp heater 33 is operated. In this case, as a method of predicting the dew condensation, for example, a method can be exemplified with which a temperature or a humidity in the vicinity of the gate or the communication area 41 is monitored, and the dew condensation is predicted in accordance with the temperature or the humidity, or the like. Also, instead of the lamp heater 33 as the drying means, an air blower may also be used. It should be noted that in a case where the air blower is used as the drying means, as in Embodiment 3 described above, the static elimination blower 32 is provided, and the wind may also be utilized.

Embodiment 5

In the present embodiment, a case will be described in which the data communication system according to the present invention is applied to the automatic entranceway and the entrance and exit gate, and whether a state is established in which the communication area of the floor cover 4A is floating with respect to the ground is monitored.

Figure 8A:
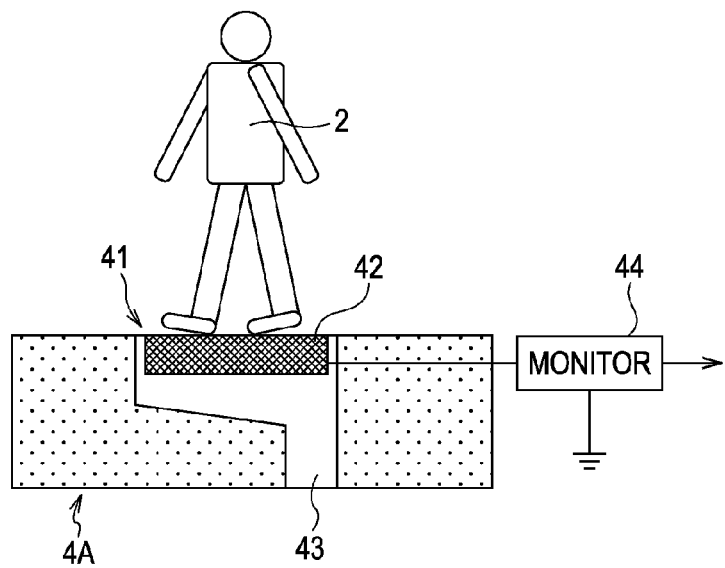
FIG. 8A is a schematic configuration drawing showing a data communication system according to Embodiment 5 of the present invention.
Figure 8B:
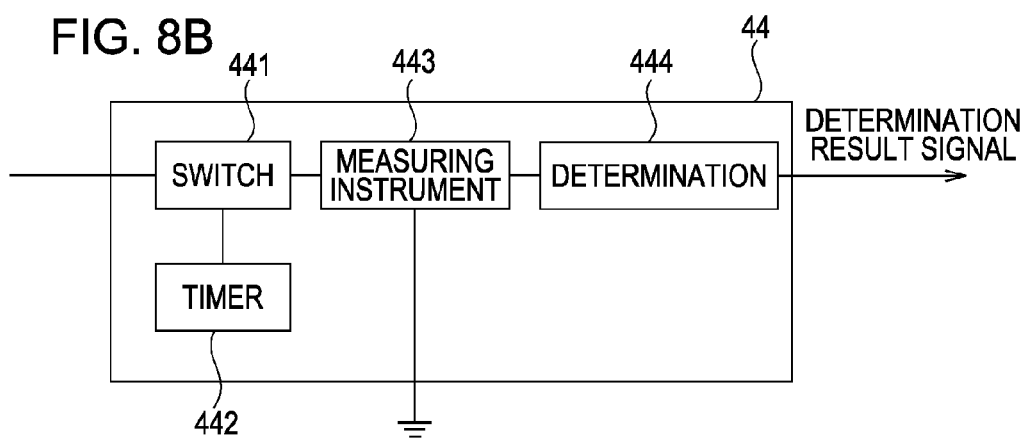
FIG. 8B shows a schematic configuration of a monitor of the data communication system shown in FIG. 8A.

FIG. 8A is a schematic configuration diagram showing a data communication system according to Embodiment 5 of the present invention, and FIG. 8B shows a schematic configuration of a monitor for the data communication system shown in FIG. 8A. In the configuration shown in FIG. 8A, the floor cover 4A is provided with a monitor 44 functioning as monitor means configured to monitor whether the communication area 41 is in the state of being electrically floating with respect to the ground of the floor cover 4A. In this case, the communication area 41 is composed of the net-like member 42, and a part thereof is made of an electric conductor such as metal. Also, the monitor 44 is electrically connected to this electric conductor. At this time, the monitor 44 is supported by the insulating body so as to be in the state of being electrically floating from the ground of the floor cover 4A. With this configuration, a user can be promptly notified of an abnormity of the system.

The monitor 44 is mainly composed, for example, as shown in FIG. 8B, of a switch 441, a timer 442, a measuring instrument 443, and a determination unit 444. The switch 441 performs a switching so that the communication area 41 of the floor cover 4A is electrically floating from the ground at a time other than measurement. The timer 442 intermittently measures a time interval for measuring an electric state of the communication area 41. The measuring instrument 443 measures an electric resistance between the communication area 41 and the ground, the electrostatic capacitance, the impedance, or the like. The determination unit 444 determines whether or not the abnormity exists on the basis of the measurement result in the measuring instrument 443. As a determination result signal from the determination unit 444 is a determination result as to whether or not the data communication is affected, an administrator of the system or the like is notified. Also, a control may also be performed so as to sound a warning beep when the system abnormity is determined. It should be noted that the configuration in the monitor 44 and the control are examples, which can be appropriately changed and embodied.

It should be noted that it suffices that the communication area is in the state of being electrically floating with respect to the ground of the floor cover, which may be a configuration other than the configurations described in Embodiments 1 to 5 described above. Also, Embodiments 1 to 5 described above can be combined appropriately and embodied. In addition, appropriate changes can be made and embodied without departing from the scope of the present invention.

Embodiment 6

In the present embodiment, a case will be described in which a communication area of a floor cover 4B contacted by the human body 2 has a relatively high impedance in a carrier frequency at the time of performing a data communication and has a relatively low impedance in a frequency lower than the carrier frequency.

Figure 9:
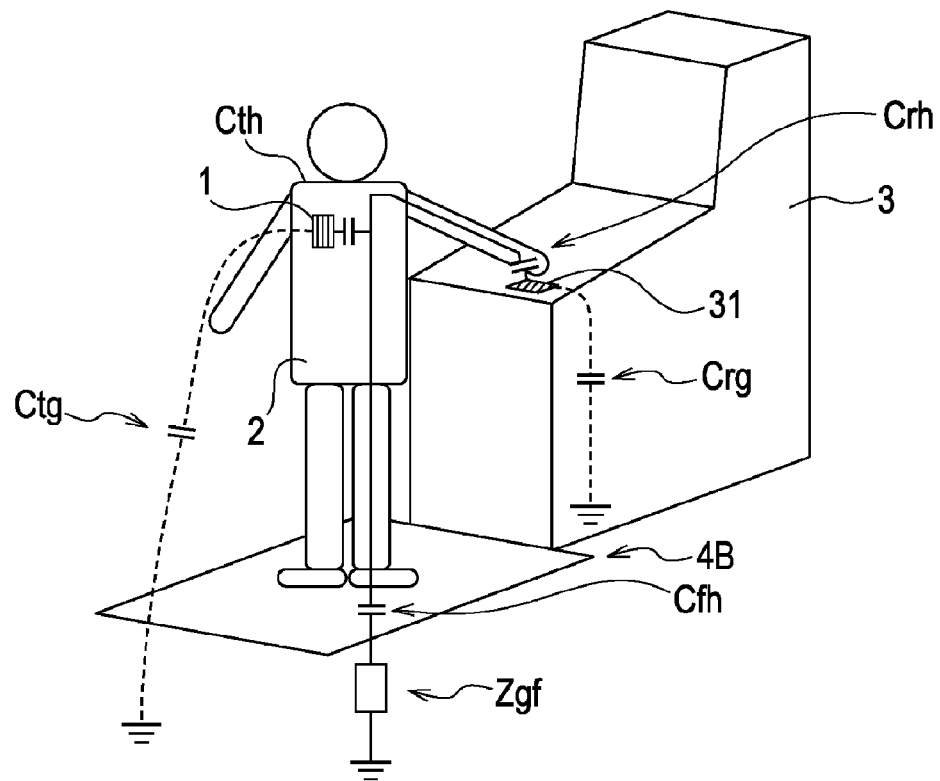
FIG. 9 shows a data communication system according to Embodiment 1 of the present invention.

FIG. 9 shows a data communication system is mainly composed of the human body 2 serving as the transmission medium for transmitting the information signal via the electric field, the mobile device 1 to which the sender for imparting the electric field in which the information signal is modulated is mounted, the stationary device 3 provided with the receiver for detecting the electric field via the human body 2 and demodulating the electric field into the information signal, and the floor cover 4B arranged in the vicinity of the stationary device 3 and also contacted by the human body 2 similarly as in FIG. 1.

Figure 11A:
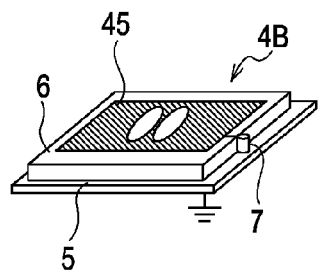
FIGS. 11A to 11C show examples of a floor cover configuration.
Figure 11B:
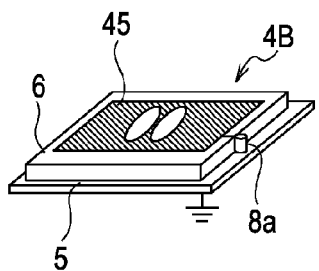
Figure 11C:
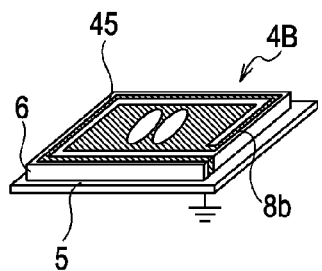

FIGS. 11A to 11C show specific configurations of the floor cover 4B. In order to have a relatively high impedance in the carrier frequency at the time of performing the data communication and have a relatively low impedance in a frequency lower than the carrier frequency, for example, as shown in FIGS. 11A to 11C, the floor cover 4B is composed of the electrode (the communication area) 45, a ground electrode 5, and a member (dielectric member) 6 composed of a dielectric arranged between those. With this configuration, an electrostatic capacitance between the electrode 45 of the floor cover 4B and the ground electrode 5 is formed.

This dielectric member 6 is preferably, for example, a porous member. As the dielectric member 6 is made of the porous member, an average dielectric constant of the dielectric member 6 becomes small. For this reason, as compared with a case where a dielectric member which is not the porous member is used, a thickness of the dielectric member 6 can be lowered. As the dielectric member 6, for example, a porous body composed of a resin material such as Teflon (registered trademark) resin or ABS resin or a ceramic material can be used.

Furthermore, in FIG. 11A, the electrode 45 is connected to the ground electrode 5 via a resistance element 7 and also connected to the ground electrode 5 via a capacitance based on the dielectric member 6. With this configuration, the resistance and the capacitance are connected in parallel to configure the low-pass filter.

Also, in FIGS. 11B and 11C, the electrode 45 is connected to the ground electrode 5 via an inductor element 8 and also connected to the ground electrode 5 via a capacitance based on the dielectric member 6. With this configuration, the inductance and the capacitance are connected in parallel to configure the resonance circuit. As an inductor configuring the resonance circuit, as shown in FIG. 11B, an inductor element 8a may be used, and as shown in FIG. 11C, an inductor pattern 8b formed on the electrode 45 may also be used.

In this communication system, similarly as in Embodiment 1, the electric field imparted to the human body 2 from the mobile device 1 is received by the electrode 31 for the communication of the stationary device 3. The electric field received by the electrode 31 for the communication is detected by the signal detection circuit (not shown) and sent to the demodulation circuit (not shown). In the demodulation circuit, the carrier wave by the mobile device 1 is used for the demodulation to obtain the information signal.

Figure 10:
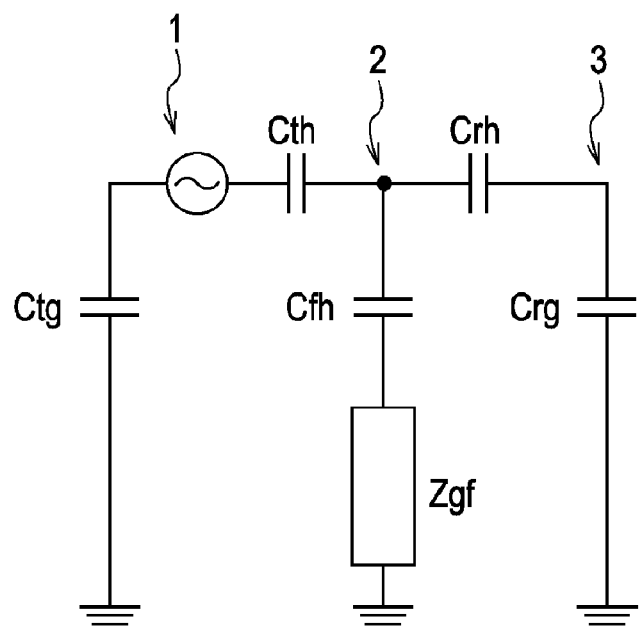
FIG. 10 shows an equivalent circuit of the data communication system shown in FIG. 1.

An equivalent circuit according to the present Embodiment 6 is shown in FIG. 10. In FIG. 10, an electrostatic capacitance between the mobile device 1 functioning as the sender and the human body 2 is set as Cth, an electrostatic capacitance between the stationary device 3 functioning as the receiver and the human body 2 is set as Crh, an electrostatic capacitance between an electrode 45 of the floor cover 4B and the human body 2 is set as Cfh, an electrostatic capacitance between the mobile device 1 and a ground of the floor cover 4B is set as Ctg, an electrostatic capacitance between the stationary device 3 and the ground is set as Crg, and an impedance between the electrode 45 the floor cover 4B and the ground is set as Zgf. Also, the mobile device 1 is a signal source and represented as an alternate current source, and the human body 2 is treated as an electric conductor. The stationary device 3 is electrically connected to the ground of the floor cover 4B. It should be noted that even in a case where the stationary device 3 is set as the sender, and the mobile device 1 is set as the receiver, one skilled in the art can easily understand that the equivalent circuit becomes similar.

In such a configuration, as the impedance Zgf between the electrode 45 the floor cover 4B and the ground is adjusted to be relatively high in the carrier frequency at the time of performing the data communication, the surface potential of the human body 2 can be set high, and the signal from the mobile device 1 can be efficiently transmitted. Also, by adjusting so as to be relatively low in a frequency lower than the carrier frequency, the surface potential of the human body 2 can be set low, and the electric charge such as the static charge can be efficiently let out to the ground.

Figure 12:
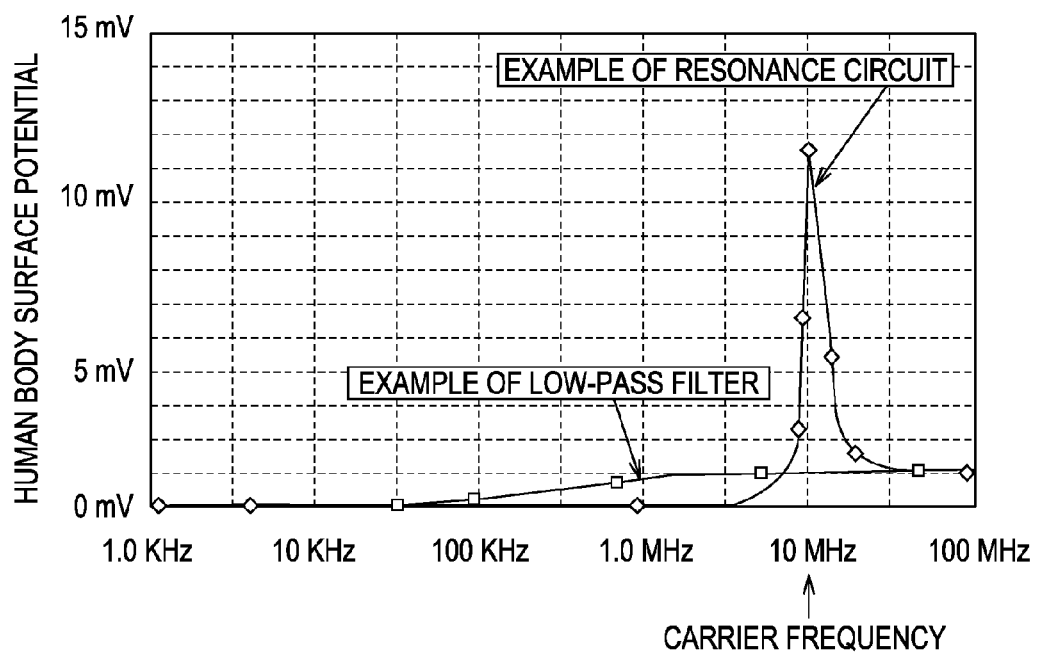
FIG. 12 shows a relation between a human body surface potential amplitude and a frequency.

Herein, on the basis of the equivalent circuit shown in FIG. 10, while a signal is supplied at an amplitude of 1 Vp-p from an AC power source, a relation between a human body surface potential and a frequency in a case where the impedance Zgf is composed of a low-pass filter is simulated. A result thereof is shown in FIG. 12. Also, while the signal is supplied at the amplitude of 1 Vp-p from the AC source, a relation is simulated between the human body surface potential and the frequency in a case where the impedance Zgf is composed of a resonance circuit. A result thereof is also described in FIG. 12. It should be noted that in this case, the electrostatic capacitance Cth between the mobile device 1 and the human body 2 is set as 10 pF, the electrostatic capacitance Crh between the stationary device 3 and the human body 2 is set as 10 pF, the electrostatic capacitance Ctg between the mobile device 1 and the human body 2 is set as 10 fF, and the electrostatic capacitance Crg between the stationary device 3 and the ground is set as 1 nF. Also, the carrier frequency is supposed to be 10 MHz.

Herein, a specific configuration of the low-pass filter is shown in FIG. 11A. A surface of the floor cover 4B is the electrode (the communication area) 45 composed of a conductive material, and the area is set as 900 cm2 (30 cm×30 cm). Then, the porous member (with the thickness of 10 cm and the specific inductive of 1.3=10 pF) is used for the dielectric member 6, and for the resistance element 7, one with 30 kΩ is used. Also, the resistance of 30 kΩ and the capacitance of 10 pF are connected in parallel.

Also, a specific configuration of the resonance circuit is shown in FIG. 11B or FIG. 11C. In the structure shown in FIG. 11B, in the floor cover 4B, the area of the electrode 45 is 900 cm2 (30 cm×30 cm), for the dielectric member 6, the porous member (with the thickness of 9 cm and the specific inductive of 1.3=11.5 pF) is used, and for the inductor element 8a, one with 22 μH is used. Also, the inductance of with 22 μH and the capacitance of 11.5 pF are connected in parallel. Also, In the structure shown in FIG. 11C, for the floor cover 4B, the area of the electrode 45 is set as 900 cm2 (30 cm×30 cm), for the dielectric member 6, the porous member (with the thickness of 9 cm and the specific inductive of 1.3=11.5 pF) is used, and the inductor pattern 8b is arranged around the electrode 45 of the floor cover 4B. Also, the inductance of 22 μH and the capacitance of 11.5 pF are connected in parallel.

The electrostatic capacitance of the floor cover 4B electrically connected to the ground (the electrostatic capacitance Cfh between the floor cover 4B and the human body 2) is estimated to be about 110 pF when it is supposed that the shoe sole is rubber or the like. Instead of the configuration according to the present invention, in the case of the floor cover 4B which is electrically connected to the ground, the surface potential is about 0.09 mV. On the other hand, with the configuration according to the present invention, as being understood from FIG. 12, in a case where the impedance Zgf is composed of the low-pass filter, the surface potential is about 1 mV, and in a case where the impedance Zgf is composed of the resonance circuit, the surface potential is about 12 mV.

In this manner, according to the present embodiment, the impedance between the floor cover 4B and the ground is appropriately adjusted. To be specific, the adjustment is performed so as to have a relatively high impedance in the carrier frequency at the time of performing the data communication and also have a relatively low impedance in a frequency lower than the carrier frequency. For this reason, in the carrier frequency, the potential of the human body 2 surface serving as the transmission medium becomes large, and it is suppressed that a greater part of the electric field sent from the sender to the human body 2 flows from the human body 2 into the ground of the floor cover 4B, so that the transmission efficiency in which the electric field corresponding to the information signal reaches the receiver can be increased. Also, as having the relatively low impedance in the frequency lower than the carrier frequency, the electric charge based on the static charge can be let out to the ground.

Therefore, according to this configuration, while suppressing the sending power, even with an inexpensive receiver, the reliable communication can be performed, and also the countermeasure against the static electricity can be implemented.

Also, as being understood from the example of FIG. 12, the impedance Zgf preferably becomes largest in the carrier frequency. By performing the adjustment in this manner, as the transmission efficiency of the data communication is improved, the sending power can be further suppressed. For this reason, the power consumption of the device to which a sending module such as an IC card is mounted is suppressed, and the battery life can be extended.

It should be noted that according to the above-mentioned embodiments, the case has been described in which the porous member is used for the dielectric member, but according to the present invention, the impedance may be adjusted by providing a hole on an under side of the floor material. In addition, appropriate changes can be made and embodied without departing from the scope of the present invention.

It should be noted that according to Embodiments 1 to 6 described above too, the mobile device 1 can be set as the sender or the receiver, and the stationary device 3 can be set as the receiver or the sender.

The present invention is not limited to Embodiments 1 to 6 described above, and various changes can be made and embodied. For example, by respectively embedding the sender/receiver in the mobile device and the stationary device, the bidirectional communication can also be performed. Also, Embodiments 1 to 6 described above can be appropriately combined and embodied. In addition, appropriate changes can be made and embodied without departing from the scope of the present invention.

What is claimed is:

1. A data communication system comprising:
   a sender including modulation means configured to modulate an information signal into an electric field;
   a receiver including demodulation means configured to demodulate the electric field into the information signal;
   a transmission medium configured to transmit the information signal via the electric field and take along the sender or the receiver; and
   a floor cover arranging the sender or the receiver as a stationary device and also being contacted by the transmission medium,
   wherein the floor cover has a communication area contacted by the transmission medium at the time of performing a data communication between the sender and the receiver,
   wherein the communication area is in a state of being electrically floating with respect to a ground of the floor cover,
   wherein an electrostatic capacitance between the communication area contacted by the transmission medium and the ground is equal to or smaller than an electrostatic capacitance between the receiver and the transmission medium, and
   wherein an electrostatic capacitance between the communication area contacted by the transmission medium and the ground is equal to or smaller than 10 pF.

2. The data communication system according to claim 1, wherein the communication area includes a drainage area provided so as to run through the floor cover and a net-like member covering the drainage area.

3. The data communication system according to claim 1, further comprising static elimination means configured to neutralize an electric charge of the transmission medium when or before the transmission medium enters the communication area.

4. The data communication system according to claim 1, further comprising drying means configured to dry the floor cover.

5. The data communication system according to claim 1, wherein the floor cover further includes monitor means configured to monitor whether the communication area is in the state of being electrically floating with respect to the ground of the floor cover.

6. A data communication system comprising:
   a sender including modulation means configured to modulate an information signal into an electric field;
   a receiver including demodulation means configured to demodulate the electric field into the information signal;
   a transmission medium configured to transmit the information signal via the electric field and take along the sender or the receiver; and
   a floor cover arranging the sender or the receiver as a stationary device and also being contacted by the transmission medium,
   wherein the floor cover is connected to a ground via an impedance member having a relatively high impedance in a carrier frequency at the time of performing a data communication between the sender and the receiver and having a relatively low impedance in a frequency lower than the carrier frequency.

7. The data communication system according to claim 6, wherein the impedance member is composed of a capacitance element arranged between the floor cover and the ground and a resistance connected in parallel with the capacitance element.

8. The data communication system according to claim 6, wherein the impedance member is composed of a capacitance element arranged between the floor cover and the ground and an inductor connected in parallel with the capacitance element.

9. The data communication system according to claim 7,
   wherein the floor cover includes a communication area contacted by the transmission medium at the time of performing the data communication between the sender and the receiver and a ground electrode arranged substantially parallel with the communication area, and
   wherein the capacitance element is an electrostatic capacitance formed between the communication area and the ground electrode.

10. The data communication system according to claim 9, wherein a porous dielectric is arranged between the communication area and the ground electrode.

11. The data communication system according to claim 6, wherein a value of the impedance element becomes largest in the carrier frequency.

12. The data communication system according to claim 1, wherein the sender is a mobile device, and the receiver is a stationary device.

13. The data communication system according to claim 1, wherein the sender is a stationary device, and the receiver is a mobile device.

14. The data communication system according to claim 6, wherein the sender is a mobile device, and the receiver is a stationary device.

15. The data communication system according to claim 6, wherein the sender is a stationary device, and the receiver is a mobile device.

\* \* \* \* \*